United States Patent [19]

Siccardi

[11] Patent Number: 4,524,722
[45] Date of Patent: Jun. 25, 1985

[54] LIVESTOCK ENCLOSURE ENVIRONMENTAL CONTROL METHOD

[76] Inventor: Frank J. Siccardi, 204 Warren Way, Apartment 20, Modesto, Calif. 95356

[21] Appl. No.: 569,796

[22] Filed: Jan. 11, 1984

[51] Int. Cl.³ .............................................. A01K 31/20
[52] U.S. Cl. ....................................................... 119/21
[58] Field of Search ........................ 119/21, 16, 31, 33, 119/34; 432/37

[56] References Cited

U.S. PATENT DOCUMENTS

| | | | |
|---|---|---|---|
| 2,385,682 | 9/1945 | Burkholder, Jr. | 119/34 |
| 4,151,811 | 5/1979 | Truhar | 119/21 |
| 4,278,423 | 7/1981 | Siccardi | 432/37 X |

Primary Examiner—Hugh R. Chamblee
Attorney, Agent, or Firm—Robert R. Keegan

[57] ABSTRACT

A method is disclosed for providing a poultry house or other livestock enclosure with an environment favorable for animal growth and unfavorable to propagation of microorganisms which includes starting the grow out cycle with the birds confined to about one-quarter of the enclosure and expanding the area with increasing body weight while keeping the body weight to area at least one pound per square foot; injecting tempered outside air mixed with inside air through an air jet device into said enclosure at a temperature below enclosure air temperature and at a velocity of about 10,000 cubic feet per minute with intermittent operation having a maximum duty factor of about 0.4 and a periodicity of about ten minutes. When outside air temperature is below 30° F. the effective area for egress of air is reduced by closing the poultry house curtains to produce a slight positive pressure during air injection; air is circulated within the house intermittently or continuously by fans mounted near the peak of the roof and directed lengthwise of the house; the duty factor of the air injection process is increased as total body weight increases and volume of injected outside air is reduced for lower outside temperatures.

19 Claims, 3 Drawing Figures

LIVESTOCK ENCLOSURE ENVIRONMENTAL CONTROL METHOD

The present invention relates to providing a favorable environment in a poultry house or other form of livestock enclosure. The production of broilers in the poultry industry involves a grow out stage in which many thousands of young chicks are delivered to poultry houses in rural areas where they are sheltered in poultry houses and provided with food and water through a growth cycle of some six weeks or more. Broilers are not individually confined in cages, but are confined en masse in the poultry house by the thousands. A typical poultry house might be forty feet wide by four hundred feet long, and is of relatively light construction and provided with large openings along its length for natural ventilation in the summer; the curtains are closed to maintain heat in the winter. In view of the low duty factor and temperature rise desired fuel consumption is reduced by 70-80% as compared to conventional methods.

The present invention deals primarily with control of the environment in such poultry houses during those periods of the year when the minimum temperatures may drop below 60° to 70°, but it is also adaptable to the warmer seasons when it may be used in conjunction with other ventilation methods to prevent overheating of the birds. Throughout this discussion the main emphasis will be on poultry production, and particularly broiler production, but it will be understood that the method is adaptable to other small livestock particularly and also larger livestock or dairy animals which may be confined in shelters during seasons of cold or inclement weather. Livestock will be understood to include animals which are produced for reasons other than food, such as rabbits or other fur-bearing animals.

The method according to the present invention primarily involves controllably injecting outside air at high velocity into the poultry house on an intermittent basis while controlling the density of the birds in the house and the area of egress for injected air from the house. Brooder stoves for heating are used only in a small section of the house and only for the early days of the grow out cycle. The body heat of the birds is the predominant source of heat at all times and in moderate conditions may be the only source of heat. Heat is added to the injected air, for example by gaseous fuel burners, but this is done primarily for the purpose of fine temperature control and tempering the injected air temperature to facilitate mixing with the inside air. The added heat is used to maintain desired temperature along with adjustments of outside air volume and adjustments of ventilation air egress area.

According to the method of the invention the operating system is always cooling the environment because the air which is introduced into the enclosure is at a lower temperature than the air being forced out. The amount of cooling can be adjusted to maintain the proper temperature by controlling the volume of air introduced and the temperature at which it is introduced. At the same time the ventilation requirements for the environment are met in such a way as to remove moisture from the environment to the exact degree necessary to maintain the desired moisture level in the air and in the poultry litter on the poultry house floor. The latter is a very important consideration because it permits previously unrealized control of microorganism propagation. Diseases such as coccidiosis which the birds are highly susceptible to can thus be controlled directly by elimination of the causative microorganisms thereby reducing or eliminating the reliance on addition of medicinal substances to food or water.

Air circulation within the enclosure is provided by overhead fans as well as by the injection of outside air through a jet air mover. Other advantages of the method will be understood from the more detailed following description. The present method differs from previous methods of environment control in poultry houses and similar structures because such previous methods were generally viewed as cold weather heating systems. Ventilation was typically provided by natural convection and/or low velocity continuously operating fans. Almost total reliance on bird body heat to maintain the enclosured temperature was not appreciated, nor was the importance for moisture control of circulation of air and exfiltration of air from the enclosure through the walls (and limited curtain openings). In reference to prior systems for environmental control my previous U.S. Pat. No. 4,369,030 for "System for Controlled Heating and Ventilating of Poultry Houses" which is a continuation-in-part of U.S. Pat. No. 4,278,423 is excluded since it describes in part the method of the present invention and in particular describes apparatus suitable for carrying out the present method. As a description of apparatus for carrying out the present method U.S. Pat. No. 4,369,030 is referred to and incorporated by reference herein. Among previous prior endeavors to produce favorable environments in livestock enclosures referred to above, reference is made to U.S. Pat. No. 4,184,538 for Heat Exchanger Ventilating for Barns which is relevant to the extent of recognizing the magnitude and importance of body heat generated by animals as a factor in controlling animal enclosure environments in seasons of cold and inclement weather.

In addition to providing the above described features and advantages it is an object of the present invention to provide a method for controlling the environment of an enclosure for livestock or other animals which in addition to maintaining the temperature within desirable limits provides controlled ventilation intermittently forcing moisture laden air through the enclosure walls thereby maintaining optimum moisture level in the air and on the floor of the enclosure.

It is another object of the present invention to provide a method for control of the environment in enclosures for livestock or other animals with great capacity for production of body heat wherein the predominant source of heat is the animal body heat and the enclosure air temperature is maintained by periodically injecting air at high velocity to mix with the interior air, and by moderating the temperature of the injected air as necessary.

It is still another object of the present invention to provide a method for furnishing an optimum environment for livestock or other animals in an enclosure having wall openings closed by curtains wherein temperature and humidity control is achieved by adjustment of curtain opening in conjunction with periodic injection of temperate air to cause moisture laden air to be forced out through the walls of the enclosure at the curtain openings.

Other objects and advantages of the present invention will be apparent from consideration of the following description in conjunction with the appended drawings in which.

Before describing the drawings it should be pointed out that some of the apparatus suitable for carrying out the method of the invention is shown in much more detail in U.S. Pat. No. 4,369,030 "System for Controlled Heating and Ventilating of Poultry Houses" to which reference should be made and which is incorporated by reference herein.

Figure 2:
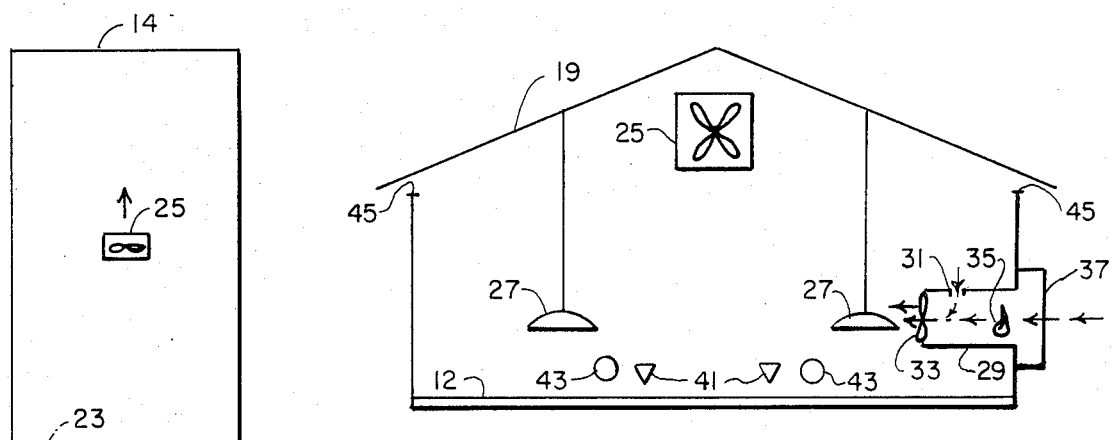
FIG. 2 is a schematic showing of a poultry house as shown in FIG. 1 as viewed from one end thereof.
Figure 1:
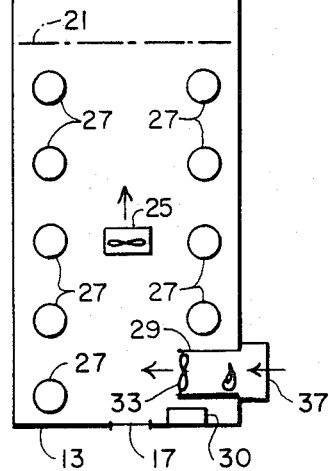
FIG. 1 is a schematic showing of a poultry house in plan view to which the present method might be applied in a typical instance.

Referring now to the drawings and particularly FIGS. 1 and 2, in the principal embodiment the method of the invention will be carried out in an appropriately equipped poultry house 11 having end walls 13 and 14 and side walls 15 and 16. A door 17 is customarily used by operating personnel; other doors may be provided which are not shown. Likewise the conventional curtained side wall and end wall openings are not shown.

Figure 3:
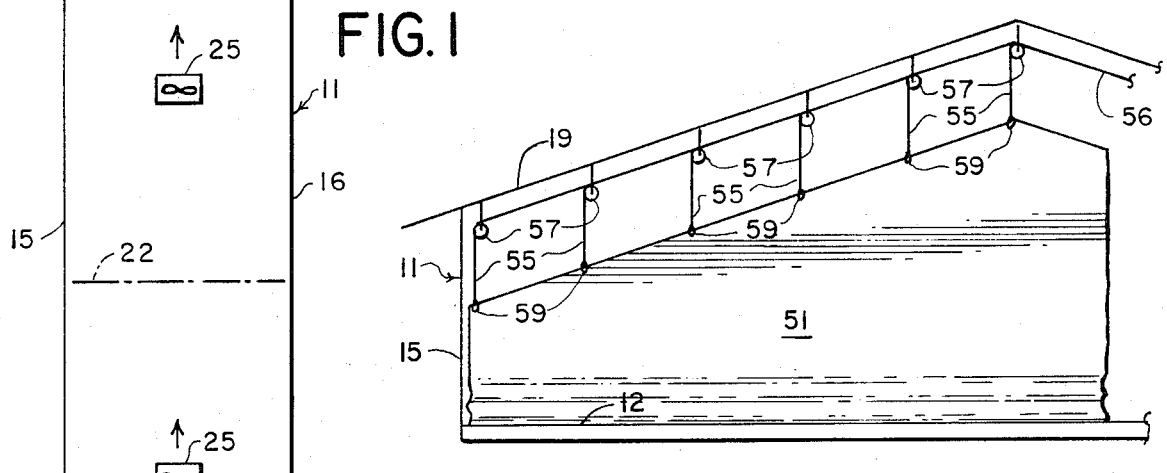
FIG. 3 is a schematic showing of exemplary partitioning apparatus employed to close off and confine the birds to one portion of the enclosure in accordance with the method of the present invention.

There are three division points within the house indicated by dot-dash lines at 21, 22, and 23. This permits the house to be divided in quarters by partition curtains. This is not a new concept in itself, but in conjunction with all the steps of the method according to the invention is quite important. The partition curtains which may be located at positions 21, 22, or 23 are not only for the purpose of confining the birds to one-quarter, one-half, or three-quarters of the house in earlier stages of development, but also restrict the volume of house to which the system is applied according to the method. In other words, referring to FIG. 3, a partition curtain 51 in house 11 is configured to be arranged from floor to ceiling and side to side to control the volume of air flow past the point of partition and if desired restrict it to a very low level. Curtain 51 may be black plastic sheet material of 2 mil thickness normally. For very cold weather conditions the curtains may be a double thickness and may be spaced apart by about one-half inch. Only one-half of the curtain partition is shown in FIG. 3 and it will be understood that the partition curtain 51 extends the full width of the house and from the floor 12 to a point very close to the roof 19. In FIG. 3 the partition is shown with a gap of a foot or more from the roof 19 but it will be understood that it may be raised to reduce the gap to several inches or less.

As shown in FIG. 3 pulleys 57 are provided near the roof 19 and cords 55 run over pulleys 57 and are connected with hooks 59 to partition curtain 51. Cords 55 join together on a line 56 which runs to an accessible point on the wall of the house 11 where it can be hand manipulated to raise and lower partition curtain 51.

Circulating air movement is provided according to the method of the invention by standard 36 inch poultry house fans 25 located near the peak of roof 19. The method contemplates that the air movement from fans 25 be generally lengthwise of the poultry house and may be tilted up by about 1° to 5°, although of course the air will diffuse and circulate throughout the enclosure. The fans are preferably spaced about 100 feet apart and located 30 feet to 50 feet from a partition position toward the door 17.

One-quarter of the poultry house 11 is provided with conventional brooder stoves 27 which may be fueled by natural gas or liquidified petroleum gas. The brooder stoves 27 are used in a generally conventional manner for the initial stages of the grow out cycle and are normally not employed for heating after the chicks have been released to the half house by removal of the partition at partition point 21.

The step of injecting outside air at high velocity according to the method is carried out by the air jet device 29 which is provided with an adjustable opening 31 for allowing interior air to mix with the injected outside air. A fan 33 draws air both from the outside and through opening 31. A gas fired heater indicated schematically at 35 and all elements of the air jet device 29 are controlled from controls in a box 30 which may be conveniently located on the air jet device or near door 17. Screens, louvers, and dampers for the air jet device 29 are in an enclosure 37 outside the poultry house 11. As previously mentioned an air jet device suitable for carrying out the present method is shown in detail in U.S. Pat. No. 4,369,030.

The poultry house 11 will be provided with automatic feeders 43 and automatic waterers 41 which do not expressly enter into the steps of the method according to the present invention. However, waterer 41 should be of the dry cup type to avoid large water surface areas and spillage of water tending to increase the humidity within poultry house 11.

The openings at the top of the curtains (not shown in the schematic drawings) are indicated at 45 in FIG. 2. It will be understood that there are conventional curtains on side walls 15 and 16 of the house, and also on at least one end 14 of poultry house 11. Although the method is expected to be carried our in such a conventional poultry house arrangement, other structures which permit the area for egress of injected air to be controlled between a high value and a quite low value might be employed. The ability to control the area for egress of ejected air has several purposes. When area for egress is very limited, to an inch gap or less, the high volume of air injected by the jet air mover creates a very slight positive pressure differential within the house so that exfiltration of air takes place on both sides and ends of the house rather than having air discharged only near the jet air mover. For very small curtain openings the pressure differential produced during fan operation also helps to prevent ingress of cold air through other cracks or other openings in the structure. To a lesser extent the heating expansion of air after the air jet device has turned off forces air out of the house through small openings around the curtains and elsewhere.

While the method of the invention has been described throughout as applied to a poultry house with the brooder section in one end and the air jet device located in that end, the method is equally adaptable to center house brooder arrangements where approximately the center one-quarter of the house is provided with brooder stoves and other accoutrements of the early portion of the grow out cycle. In such case the expansion of area in use proceeds both directions from the middle, and the air jet device would be located in the center of the house.

The ability to permit quite large areas for egress of air from the house is primarily an advantage in hot weather seasons where additional circulation of outside air induced by convection and natural air movements is desirable. That is, in hot weather conditions there is no problem with excessively lowering the house interior temperature because of the introduction of too much cold ambient air. As previously mentioned the method according to the invention is particularly adapted to deal with cold weather conditions and while it is also effective in warm weather conditions supplemental air circulation or cooling would be required in extremely hot weather conditions in accordance with the usual practice in growing poultry or other livestock.

While the primary features of the invention involve controlling the body weight per unit of effective area of the enclosure and introducing air in a controlled volume at a controlled temperature in a cyclic manner, these features interrelate with other characteristics of the growing operation which are not in themselves unique. Accordingly exemplary features of an overall poultry grow out operation will be described for background and for its relation to the unique features of the method of the invention.

First it should be mentioned that the operation described is for a latitude of about 30° to 40° in the United States and obvious adjustments would need to be made for extreme northen or extreme southern areas. A poultry house is customarily located with an east west axis, more specifically about 15° to 20° north of east. Some protection from north winds is desirable and full exposure to the south is also advantageous. Specifically the house should not be in a closed valley which would restrict air circulation and tend to have extremes of temperature. Houses on level terrain should be no closer than 100 to 150 feet apart.

Poultry house structures are typically steel-truss structures with 6 foot high side walls, a width of 40 feet and a roof pitch of 3/12. Insulation may be provided in the form of one-half inch foam and 1 foot roof eaves are typical. Black (for example tradename "Lohrtech") 5 foot curtains are on all sides and ends. The upper 1 foot thereof is preferably white or clear. Two or three 8 foot roof ventilators are provided which should preferably be in the full (75% or 100%) portion of the house rather than in the brooding portion.

Brooder stoves are 30,000 BTU jet-type brooders with mechanical safety pilot and solenoid, thermostat controlled for main or full burn, and a gas cock to shut off the main burn on every other brooder stove. They are zone controlled via thermostats hung 2 feet over the feed trough and between two stoves closest to the jet air mover. About one brooder stove per 1,000 or 1,200 chicks are required and are placed every 10 to 12 feet in a line 4 feet to 6 feet from the side walls on a winch adjustment mechanism. Brooders are necessary in the brooding area only (about 25% of the house).

The feed system for the birds may be of any conventional type or alternatively may be the day-one automatic system described in "Siccardi House; 60%–70% Fuel Saving Seen for New System" by William A. Haffert, Jr., *Broiler Industry*, June 1983, page 22.

The watering system is a plastic pipe-cup-type one cup per feed pan (usually every 30 inches) with one line for each feed line in the house. They are located 2 feet from the feed tube or auger and winched in the brooding area 6 feet from side wall. Outside of the brooding area they are 10 feet from side wall (the second quarter should be hung on "S" hooks for movement into brooding area for startup). There are 5 foot interruptions at 28%, 50%, and 75% house locations to accommodate partition curtains. Preferably it has one adjustable (3-6 oz.) 6 gallon per minute regulator for each 400 feet of water line with a low pressure guage at the regulator and in the end loophole. At all times water lines should be connected from one side of house to the other with no dead ends. The water supply should be such that 30 lbs. pressure minimum will be supplied to the low pressure regulators at all times with a flow rate of 10 gallons per 10,000 chicken capacity per minute as absolute minimum.

Lighting may be conventional but is preferably fluorescent. All fixtures should be 2 foot-20 watt fluorescent strips or 22 watt circular bulbs (Grainger 2E357) with Daylight bulbs or circular fluorescent (Grainger 2U699). In the brooding area one fluorescent fixture is hung in front of each brooder at every other stove with circular bulbs lengthwise in the house. In the remainder of the house there is one fluorescent 2 foot fixture or circular bulb every 30 feet hung across the house at the peak of the roof with disconnects at 28%, 50%, and 75% of the house. All lines are plugged into a receptable at the time clock. A 24 hour 15 minute tab time clock is used for lights with a four-plus receptacle attached to the time clock so that appropriate lines can be plugged in.

The preferred ceiling fan arrangement is one 36 inch standard poultry house fan (winched and hung) in the center of the house every 100 feet. Fans should be aligned so as to blow air the length of the house with a 0° to 5° tilt up. Each fan should be positioned 30 to 40 feet from each partition position toward the jet air mover. In pole type houses and low roof houses a ceiling fan 20 feet downstream from the jet air mover is needed to complete circulation. All ceiling fans are on a single (220 V.) line going through a control relay which is activated by a one hour thirty second per tab time clock (Grainger 2E357) with a thermostat overriding "On" control (Grainger 2E206).

Curtain winches of conventional form are employed with minimal modification. All curtain winches for each side of the house should be at one location on each side in the brooding area by the air jet device.

The air jet device is controlled by a time clock and two thermostats. If the pilot is lit, both tempering and cooling can occur. If the pilot is not lit, only cooling takes place. The time clock is typically a conventional one hour time clock with thirty seconds per tab. Actually a ten minute time clock would suffice, if available, since that is the preferred repeat period for the operation cycle. These tabs need to be set in the same position as the ceiling fan time clock tabs. If the outside temperature is above 30°, cycle start for the ceiling fans should be about twenty seconds ahead of the jet air mover cycle start. If the outside temperature is below 30°, the jet air device should be about twenty seconds ahead of the ceiling fans. Two thermostats are provided for the air jet device. There is a thermostat adding heat under time clock control and a run thermostat for constant running with fan only for cooling. Constant heating may be available by a manual switch (assuming the pilot is lit). When this manual switch is turned off the time clock control will resume. Constant heat running is expensive and should be avoided if at all possible. If bird heat is not sufficient to avoid constant running heat this indicates the operator should close curtains, and if necessary light brooder stoves and set the brooder thermostat at 5° below the desired house temperature setting of the thermostats.

When the recirculation doors (usually on both sides of jet air device) are open, up to 30% of the air moved by the fan is recirculated within the house, therefore lowering fuel consumption. Shutting recirculation doors increases the outside air injection. A hood damper may also be used to control volume of outside air injection with temperature changes (the same volume of cold air has greater mass). If outside temperature is 20° or below, a closed hood damper allows nearly the same mass of air as at 70° outside with the hood damper open. When heat is on, the hood damper in the closed position reduces fresh air and fuel consumption. When the recirculation doors are closed, opening the hood damper further increases the outside air injection rate.

When outside temperatures are severely cold the vent opening through which air is drawn by the air jet device may be closed during the "Off" portion of the cycle. This vent closing may be done automatically by doors opened by air pressure and closed by gravity as shown in U.S. Pat. No. 3,369,030.

A gas valve is provided for adjusting the heater flame. The gas flame should be adjusted so that tempered air from the jet air mover is 10°-15° below house thermostat temperature setting. Controlled cooling, not heating, is provided by the jet air moving device.

One of the fundamentals of the method according to the invention is the primary reliance on animal body heat to keep the environment temperature as high as desirable when the outside temperature is substantially lower than the desired environment temperature.

One could derive elaborate equations based on observed animal heat output for different species and animal weights as a basis for the determination of preferred values for area provided per animal as a function of age, for quantity of fresh air injected at specific stages, etc. Studies have been made along these lines, but they did not prove particularly successful in arriving at a method of environmental control yielding optimum results. See for example, "The Energy Crisis—A Problem-Opportunity for Broiler Growers"; Siccardi, F. J.; *Poultry Digest;* Jan. '81.

The method according to the invention is primarily an empirically derived one. It is based essentially on keeping the bird body weight per unit area of enclosure in use sufficiently high to supply the heat to make up normal heat losses to the outside at the lowest temperatures to be encountered, plus nearly enough heat to offset the cooling effect of the introduction of outside air needed to displace moist unhealthful air (accomplished by a pulsed high volume air jet apparatus).

The maximum bird body weight permitted before enlarging the area of the enclosure in use is affected by factors other than amount of heat production and is also determined largely empirically. These procedures are, of course, modified during the very early brooder stage and the first week to two weeks when higher temperatures may be provided by conventional brooder stoves.

Subject to these and other limitations the area per pound of bird weight is targeted at about one-half square foot and in no case more than one square foot. The upper limit of bird weight before expanding the enclosure is about four pounds per square foot.

It is known that heat production of bird body heat is not a linear function of weight, and smaller birds produce the BTU's per hour per pound than larger ones. Nonetheless the increase of enclosure area from two weeks to seven weeks generally based on body weight has been found to be very effective, especially in the cold weather seasons.

In the examples of the method shown in tabular form below in Examples 1, 2, and 3, it will be understood that the definitions of Winter, Spring, Summer, and Fall may depend on temperatures for the locality involved and particularly the minimum daily low temperature for the dates in question. The seasons do not arrive strictly according to the calendar as any livestock grower could attest. A cycle which will end in a colder season must follow the schedule for that season from the start. Otherwise the schedule might call for a reduction of house area in use, not a suitable procedure.

The air jet device is a high velocity air mover which will produce a total air flow of from 5,000 to 15,000 cubic feet per minute. Some of the air output of the air jet device may be recirculated interior air, but at least one-half of the total air volume will be outside air brought in, and in some cases temperature moderate, by the air jet device. Specific run times for the air jet device are shown in the preferred embodiments of Examples 1, 2, and 3. However, a general rule of thumb for the pulsed air injection according to the method of the invention is to replace from between 5% and 50% of the volume of air in the active portion of the livestock enclosure with each cycle of high velocity input from the air jet device. For example, an active enclosure volume of 64,000 cubic feet provided with an air jet device moving 12,000 cubic feet of air per minute would call for a run time of from 16 seconds to 160 seconds by the above described general rule of thumb. A periodicity of 5 minutes to 15 minutes is considered most advantageous although periods as short as 2 minutes or as long as 60 minutes would still achieve some of the benefits of the method of the invention. The duty cycle or duty factor is the fractional portion of a period that the jet air device is operative and may range from 0.04 to 0.7. The preferred embodiment duty factor fall between about 0.1 and about 0.4, however.

Preferably the heating of input air is controlled by interior thermostats out of the direct path of air flow from the air jet device. In a simple system the air heater is activated if the interior temperature falls below a thermostat setting. One or more additional thermostat settings could be provided to supply additional heat if desired. In any case the fuel supply rate and heat level is manually adjustable. Thus, according to the method injection of large quantities of air at a high flow rate on a cyclic basis is utilized to drive warm moisture laden air through the walls and ends of the enclosure of efficiently remove moisture and maintain the proper moisture level in the poultry house. This also results in cooling of the poultry house environment and overcooling is prevented by adding heat to the injected air as necessary (without raising its temperature more than about 10° below the poultry house interior temperature).

Examples 1, 2, and 3 below in tabular form give specific values for cycle times, thermostat settings, environment areas, etc. for prescribed bird ages and are preferred embodiments of the method of the invention. It will be appreciated that numerous variations and modifications may be made to the specific values within the scope of the invention. Also the tables of Examples 1, 2, and 3 must be considered in conjunction with the remainder of the description of the method to take into consideration optional factors or special situations.

EXAMPLE #1

| | SEASON - WINTER | | | | | | | |
|---|---|---|---|---|---|---|---|---|
| Age of Birds, days | 0-5 | 5-10 | 10-14 | 14-21 | 21-28 | 28-35 | 35-42 | 42- |
| % of House | 25% | 25% | 25% | 25% | 50% | 50% | 75% | 100% |
| Brood Stove Temp. | 82° | 78° | 78° | 78°-off | off | off | off | off |
| CURTAIN OPENING* | | | | | | | | |
| Outside Low Temp. | | | | | | | | |
| 50's | 1" | 3" | 3" | 4" | 4" | 6" | 6" | 6" |
| 40's | 0 | 2" | 2" | 3" | 3" | 4" | 4" | 4" |
| 30's | 0 | ½" | ½" | 1½" | 1½" | 2" | 2" | 2" |
| Below 30 | 0 | 0 | 0 | ½" | ½" | 1" max. | 1" max. | 1" max. |
| FANS | 88° | 86° | 86° | 80° | 80° | 76° | 76° | 74° |
| Constant Run | | | | | | | | |
| AIR JET | | | | | | | | |
| Timer Sec/10 min. | 30 + 0 | 30 + 0 | 30 + 0 | 60 + 30 | 60 + 30 | 90 + 60 | 90 + 60 | 120 + 60 |
| Main Heat | 82° | 78° | 78° | 76° | 76° | 72° | 72° | 70° |
| Cool (constant) | 88° | 86° | 86° | 80° | 80° | 76° | 76° | 74° |

EXAMPLE #2

| | SEASON - FALL OR SPRING | | | | | | | |
|---|---|---|---|---|---|---|---|---|
| Age of Birds, days | 0-5 | 5-10 | 10-14 | 14-21 | 21-28 | 28-35 | 35-42 | 42- |
| % of House | 25% | 25% | 25% | 50% | 50% | 50% | 100% | 100% |
| Brood Stove Temp. | 82° | 78° | 78°-off | off | off | off | off | off |
| CURTAIN OPENING* | | | | | | | | |
| Outside Low Temp. | | | | | | | | |
| 50's | 1" | 3" | 3" | 4" | 4" | 6" | 6" | 6" |
| 40's | 0 | 2" | 2" | 3" | 3" | 4" | 4" | 4" |
| 30's | 0 | ½" | ½" | 1½" | 1½" | 2" | 2" | 2" |
| Below 30 | 0 | 0 | 0 | ½" | ½" | 1" max | 1" max | 1" max |
| FANS | 88° | 86° | 86° | 80° | 80° | 76° | 76° | 74° |
| Constant Run | | | | | | | | |
| AIR JET | | | | | | | | |
| Timer Sec/10 min. | 30 + 0 | 30 + 0 | 30 + 0 | 60 + 30 | 60 + 30 | 90 + 60 | 90 + 60 | 120 + 20 |
| Main Heat | 82° | 78° | 78° | 76° | 76° | 72° | 72° | 72° |
| Cool (constant) | 88° | 86° | 86° | 80° | 80° | 76° | 76° | 74° |

EXAMPLE #3

| | SEASON - SUMMER | | | | | | | |
|---|---|---|---|---|---|---|---|---|
| Age of Birds, days | 0-5 | 5-10 | 10-14 | 14-21 | 21-28 | 28-35 | 35-42 | 42- |
| % of House | 25 | 25 | 50 | 50 | 100 | 100 | 100 | 100 |
| Brood Stove Temp. | 82° | 78° | off | off | off | off | off | off |
| CURTAIN OPENING* | | | | | | | | |
| Outside Low Temp. | | | | | | | | |
| Above 60 | 2" | 4" | 4" | 6" | 6" | 10" to max | 10" to max | 10" to max |
| 50's | 1" | 3" | 3" | 4" | 4" | 6" | 6" | 6" |
| 40's | 0 | 2" | 2" | 3" | 3" | 4" | 4" | 4" |
| 30's | 0 | ½" | ½" | 1½" | 1½" | 2" | 2" | 2" |
| FANS | 88° | 86° | 86° | 80° | 80° | 76° | 76° | 74° |
| Constant Run | | | | | | | | |
| AIR JET | | | | | | | | |
| Timer Sec/10 min. | 30 + 0 | 30 + 0 | 30 + 0 | 60 + 30 | 60 + 30 | 90 + 60 | 90 + 60 | 120 + 60 |
| Main Heat | 82° | 78° | 78° | 76° | 76° | 72° | 72° | 70° |
| Cool (constant) | 88° | 86° | 86° | 80° | 80° | 76° | 76° | 74° |

*After 4 weeks the end curtains should be open by double the amount given for side curtains to improve control of moisture.

In Examples 1, 2, and 3 it will be noted that there are two running times given in seconds for each ten minute timing cycle of the air jet device. For example, in the 28 to 35 days column the running time is given as 90+60. This indicated that the running time will be 90 seconds starting at the zero point of the ten minute timing cycle and there will be an additional 60 second running time at the five minute point of the ten minute running cycle. This has been found to be preferable to a single longer run in the ten minute cycle. When the running time or duty factor is only thirty seconds out of ten minutes the running time is not broken into two segments since very short running times of only 15 seconds are not preferred.

From the foregoing description and explanation it will be seen that an environmental control method for poultry houses and other livestock enclosures is provided which is especially effective in controlling temperature, humidity, other conditions to be most favorable for animal health while achieving great reductions in heating fuel, time, and risk of bird loss due to adverse conditions.

The method as described provides automatic control within a wide range of conditions and the basic method is subject to being more fully automated if desired. As described, no attention of the operator is necessary by way of adjusting curtains or the temperature of the air produced by the air jet device until a temperature change of nearly 20° is experienced. This means that a single operator without help can safely manage many more houses and many more birds with significant reductions in labor cost. By controlling the quantity of outside air injected the operator can closely control the humidity in the house which is very important to eliminate moisture and ammonia; the litter in the house is not only inoffensive but more importantly is kept in a condition unfavorable to the propagation of microorganisms harmful to the birds. Very extensive thermal insulation of the poultry house in an effort to reduce fuel costs is unnecessary because of the effective utilization of bird body heat, and lower temperature differential between inside and outside as compared to conventional methods.

Various modifications to the method have been described or suggested but additional variations and modifications will be apparent to those skilled in the art and accordingly the scope of the invention is not to be considered to be limited to those specific embodiments shown or suggested but is rather to be determined by reference to the appended claims.

What is claimed is:

1. A method of providing in an enclosure for livestock an environment favorable for the growth, quality, and survivability of livestock and unfavorable to propagation of microorganisms comprising the steps of
    forcibly injecting air into said enclosure intermittently with an air jet device controlled to have a duty factor of from 0.04 to 0.4, an on-time of at least 30 seconds, and an off-time of less than 10 minutes,
    adding heat to said air so that its temperature is between 50° F. and 70° F. in response to inside temperature sensing means,
    controlling the effective area of egress for air from said enclosure, and
    circulating the air in said enclosure with air movers directed away from the place of forcible air injection and located away from the place of forcible air injection and located at least four feet above the floor of said enclosure,
    whereby injected air primarily escapes distant from the place of injection.

2. A method as recited in claim 1 wherein said area of egress for air is at least in part distributed along the length of said enclosure.

3. A method as recited in claim 1 wherein the output volume from said air jet device is at least 5,000 cubic feet per second.

4. A method as recited in claim 1 further including the step of closing the inlet for said air jet device during the inactive portion of its duty cycle.

5. A method as recited in claim 1 further including the step of mixing an amount of inside air with outside air in said air jet device in inverse relation to the humidity in said enclosure.

6. A method as recited in claim 1 further including the step of cyclically operating said air movers in synchronization with said air jet device.

7. A method as recited in claim 1 further including the step of increasing the duty factor of said jet device in response to increased total body weight of said livestock.

8. A method as recited in claim 1 wherein the periodicity of said intermittent forcible air injection is about 10 minutes.

9. A method as recited in claim 8 wherein said duty factor varies from about 0.05 to about 0.4 in relation to total livestock body weight.

10. A method of providing in an elongated enclosure for livestock an environment favorable for the growth, quality, and survivability of livestock and unfavorable to propagation of microorganisms comprising the steps of
    confining said livestock to a portion not less than one-eighth of said enclosure and not greater than that corresponding to a body-weight to area factor of one pound per sq. ft.,
    forcibly injecting air into said enclosure intermittently with an air jet device controlled to have a duty factor of from about 0.05 to about 0.4 and a periodicity of from 5 minutes to 30 minutes,
    adding heat to said air so that said air temperature is not above 70° F. and is not below 40° F. in response to inside air temperature sensing means,
    controlling the effective area of egress for air from said enclosure to maintain a slight positive internal pressure relative to ambient pressure during operation of said air jet device at least when the outside temperature is below 30° F., and
    circulating the air in said enclosure with a plurality of air movers directed in a longitudinal manner located at least four feet above the floor of said enclosure.

11. A method as recited in claim 10 wherein said area of egress for air is at least in part distributed along the length of said enclosure.

12. A method as recited in claim 10 wherein the output volume from said air jet device is at least 5,000 cubic feet per second.

13. A method as recited in claim 10 further including the step of mixing inside air with the outside air in said air jet device.

14. A method as recited in claim 10 further including the step of cyclically operating said air movers in synchronization with said air jet device.

15. A method of providing in an elongated enclosure for livestock an environment favorable for the growth, quality, and survivability of livestock and unfavorable to propagation of microorganisms comprising the step of
    confining said livestock to a portion of said enclosure to the extent necessary to produce a body-weight to area factor of at least one pound per sq. ft.,
    forcibly injecting outside air into said enclosure intermittently with an air jet device controlled to have an on time of at least 30 seconds and an off time of no more than 10 minutes,
    adding heat to said air so that its temperature is above 40° F. and is less than 70° F. in response to inside air temperature sensing means,
    controlling the effective area of egress for air from said enclosure to maintain a slight positive pressure relative to ambient pressure during the operation of said air jet device at least when the outside temperature is below 30° F., and
    circulating the air in said enclosure with air movers directed in a longitudinal manner located at least four feet above the floor of said enclosure,
    whereby injected air primarily escapes distant from the place of injection.

16. A method as recited in claim 15 wherein said area of egress for air is at least in part distributed along the length of said enclosure.

17. A method as recited in claim 15 wherein the air output volume from said air jet device is at least 5,000 cubic feet per second.

18. A method as recited in claim 15 further including the step of mixing inside air with the outside air in said air jet device.

19. A method as recited in claim 15 further including the step of cyclically operating said air movers in synchronization with said air jet device.

* * * * *

UNITED STATES PATENT AND TRADEMARK OFFICE
CERTIFICATE OF CORRECTION

PATENT NO. : 4,524,722
DATED : June 25, 1985
INVENTOR(S) : Frank J. Siccardi

It is certified that error appears in the above-identified patent and that said Letters Patent is hereby corrected as shown below:

In Column 11, line 51 (claim 3) change "second" to --minute--.

In Column 12, line 34 (claim 12) change "second" to --minute--.

In Column 13, line 4 (claim 17) change "second" to --minute--.

Signed and Sealed this

Fifteenth Day of August, 1989

Attest:

DONALD J. QUIGG

*Attesting Officer*     *Commissioner of Patents and Trademarks*